US006933879B2

United States Patent
Roze et al.

(10) Patent No.: US 6,933,879 B2
(45) Date of Patent: Aug. 23, 2005

(54) METHOD AND SYSTEM FOR LOCALIZING A TARGET IN AN INTERROGATION-RESPONSE SYSTEM

(75) Inventors: Thierry Roze, Eragny-sur-oise (FR); Jean-Marc Trin, Issy-les-moulineaux (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/405,933

(22) Filed: Apr. 3, 2003

(65) Prior Publication Data

US 2003/0222810 A1 Dec. 4, 2003

(30) Foreign Application Priority Data

Apr. 5, 2002 (FR) .............................. 02 04266

(51) Int. Cl.[7] .................. G01S 13/78; G01S 13/75; G01S 13/06
(52) U.S. Cl. .................. 342/45; 342/42; 342/118; 342/120; 342/123; 342/147; 342/175; 342/195; 342/450; 342/451
(58) Field of Search ................. 342/119–127, 450–465, 342/27, 28, 33–40, 42–51, 104–107, 109, 115, 118, 128, 133–135, 139, 146, 147, 149, 150–154, 175, 195

(56) References Cited

U.S. PATENT DOCUMENTS 3,573,823 A    4/1971    French ........................ 342/45
4,727,374 A  * 2/1988    Boulais ........................ 342/50
4,782,450 A   11/1988    Flax
4,862,176 A    8/1989    Voles ........................... 342/45
5,280,287 A    1/1994    Evans .......................... 342/45
5,892,478 A    4/1999    Moss ......................... 342/149
6,222,480 B1   4/2001    Kuntman et al.
6,278,396 B1   8/2001    Tran

FOREIGN PATENT DOCUMENTS

FR           2730567 A1    8/1996

OTHER PUBLICATIONS

A. Janex, "30 Monopulse Localization in Airborne IFF Interrogation", Institute of Electrical Engineers, Stevenage, GB, & Int'l Conference Radar 87 (Conf. Publ. No. 281), 1987, London, UK, IEE, pp. 185–188.

Van Sickle, "Allied Air Identification", Proceedings of the 1996 Ft. Wayne, IN., IEEE, Apr. 30, 1996, pp. 365–370.

* cited by examiner

Primary Examiner—Bernarr E. Gregory
(74) Attorney, Agent, or Firm—Lowe Hauptman & Berner, LLP

(57) ABSTRACT

In a method and system to determine the position of a target by means of an IFF type antenna, the antenna having a given direction of aim, the method comprises a step for combining the distance D from the target to the carrier, the altitude A of the target, the altitude $A_{pf}$ of the carrier equipped with the IFF antenna and the angular error value of the target and the direction of aim of the antenna beam to localize the target with precision. Application to IFF interrogations in mode C.

17 Claims, 3 Drawing Sheets

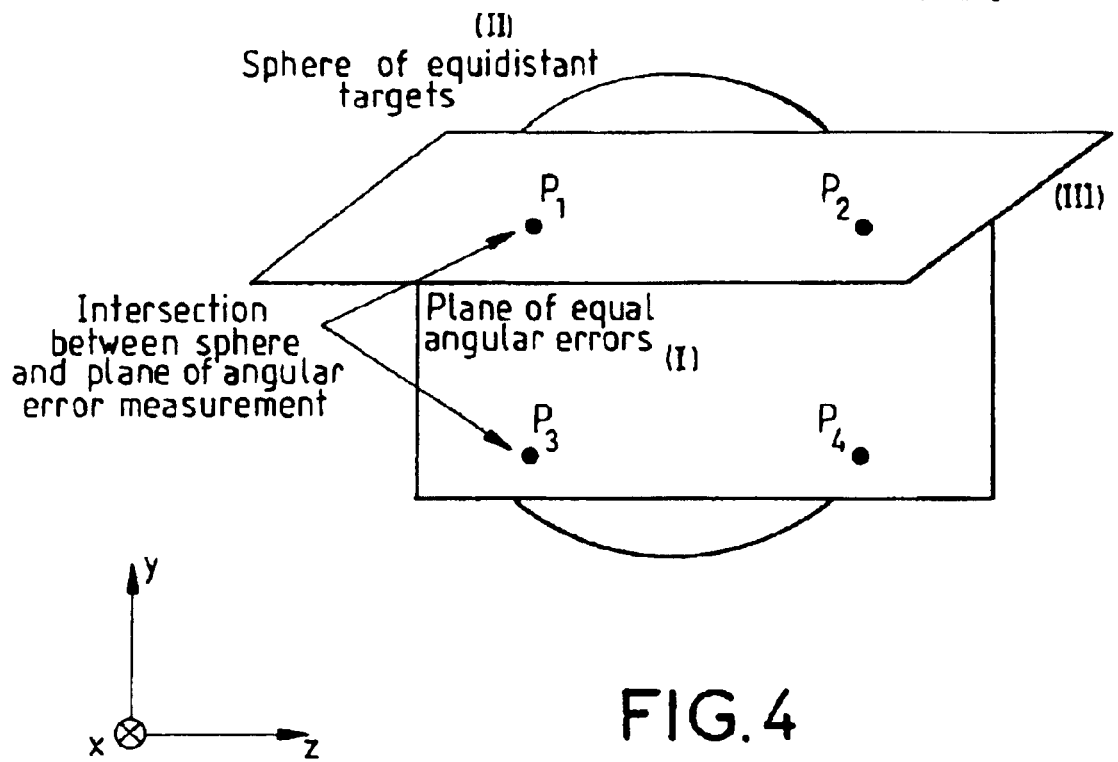
FIG.3
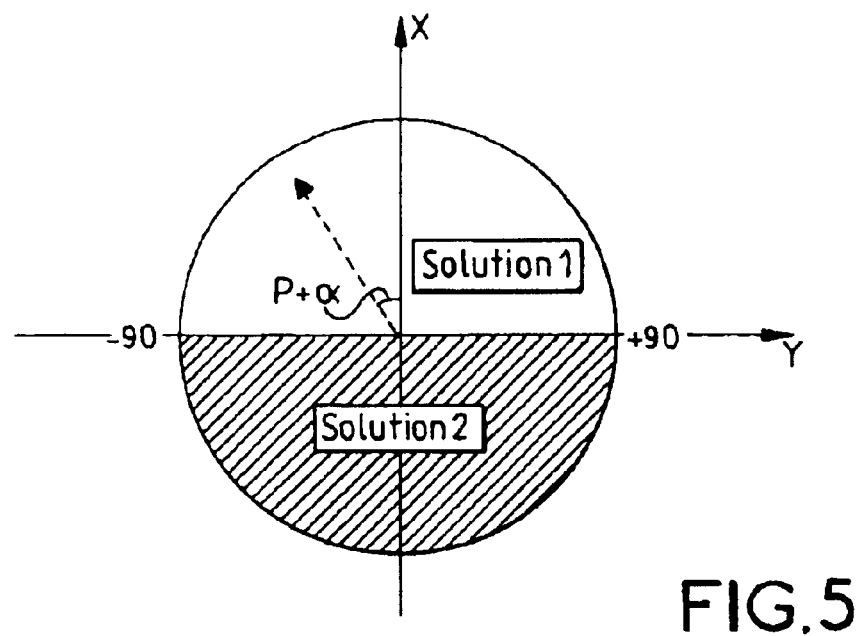
FIG.4
FIG.5

METHOD AND SYSTEM FOR LOCALIZING A TARGET IN AN INTERROGATION-RESPONSE SYSTEM

BACKGROUND OF THE INVENTION

The present invention pertains to a method and system that can be used especially to localize a target by means of a carrier equipped with an antenna having a given direction of aim, the target and the carrier communicating with each other by means of an IFF (Identification Friend or Foe) type of interrogation-response system.

It can be applied, for example, in the field of aeronautics, for an onboard IFF system also called a secondary radar whose function is to manage IFF interrogations and responses.

The localization and identification of a remote aircraft requires two radars. The primary radar localizes the target and the secondary radar, or IFF, identifies it. The correlation between these two pieces of information (localization and identification) is immediate when the primary antenna and the secondary antenna are coupled. Such an operation is commonly used for ground stations and when the radars are mechanical scanning radars.

Technological development in the field of antennas has made it possible, especially, to develop electronic scanning antennas. The antenna is then fixed and the beam-aiming direction is obtained by electronic phase-shifters whose function is to deflect the beams. The primary radar and the secondary radar are then independent of each other and it becomes more difficult to correlate the two information sources.

The transmission, by the IFF system, of information on localization and identification to the main computer of the carrier, enables this information to be associated with the localizing information obtained by the primary radar.

SUMMARY OF THE INVENTION

The invention relates to a method and a device to localize a target in space, during an IFF type interrogation process using an antenna with a given direction of aim, such as an electronic scanning antenna.

The invention relates to a method to determine the position of one or more targets by means of an IFF type antenna, the antenna having a given direction of aim, wherein the method comprises at least one step for combining at least three parameters representing the position of the target or targets, the position of the carrier and the antenna beam-aiming direction to localize the target.

The three parameters used are, for example, the distance D from the target to the carrier, the altitude A of the target and the altitude $A_{pf}$ of the carrier equipped with the IFF antenna and the angular error value of the target.

The method may comprise at least the following steps:

Determining the circle $C_1$ resulting from the intersection between the iso-distance sphere on which the target may be situated and a plane substantially parallel to the vertical plane of the carrier equipped with the IFF antenna.

Determining the circle $C_2$ that comes from the intersection between the iso-altitude plane of the target and the iso-distance sphere, Achieving the intersection of the two circles $C_1$ and $C_2$ to obtain the coordinates of the target.

The mode of interrogation from the carrier to the target is, for example, an IFF mode such as the mode C.

The invention relates also to a system for the localizing of one or more targets by means of a carrier equipped with an antenna having a given direction of aim or secondary radar wherein the system comprises at least one primary radar and an IFF system controlling the IFF secondary radar and being adapted to the implementing of at least one of the characteristics of the method explained here above.

An object of the invention has especially the following advantages:

a more precise localization of the target, since the prior art systems enable only a theoretical and approximate localization of the target based on the antenna aiming zone, the possibility of obtaining the elevation and true bearing of the target in a precise way.

BRIEF DESCRIPTION OF THE DRAWINGS

Other advantages and features of the present invention shall appear more clearly from the following description made with reference to the appended drawings, of which:

FIG. 3 is an illustration showing the possible positions of the target, FIG. 4 is an illustration showing the aircraft reference, FIG. 5 is an illustration showing a solution to remove the indeterminacy of the value of x.

MORE DETAILED DESCRIPTION

In order to provide for a clearer understanding of the object of the present invention, the following description is given by way of an illustration that in no way restricts the scope of the invention pertains to a system comprising a target to be localized and a carrier (an aircraft or platform) equipped with an electronic scanning antenna.

Since electronic scanning antennas are known to those skilled in the art and are not part of the object of the invention, their architecture shall not be described in detail.

The method can be applied both to the detection of a target that has been identified and to identifying objects or devices that are located in a given region of space.

Figure 1:
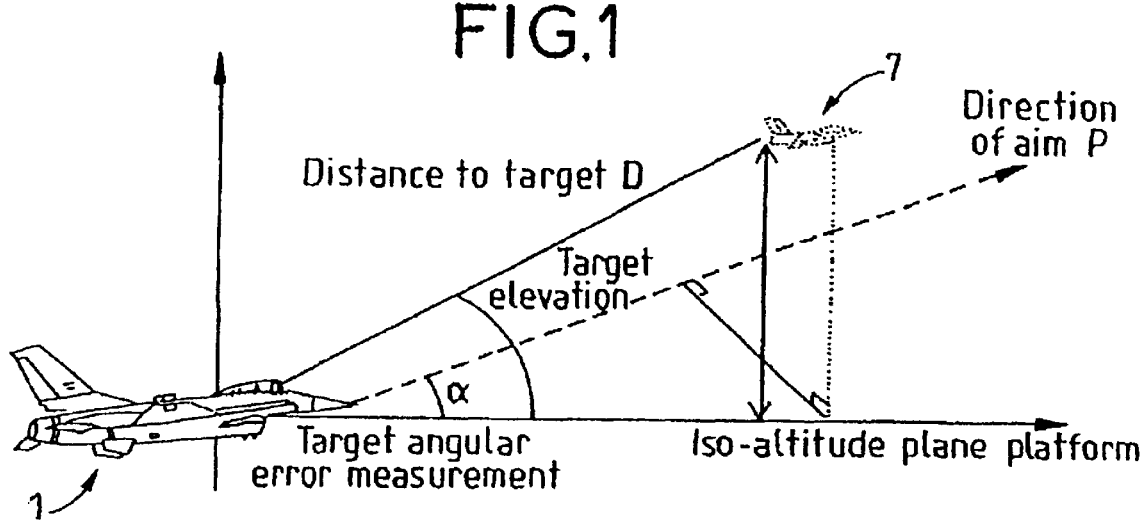
FIG. 1 is an illustration exemplifies a system of localization.
Figure 1:
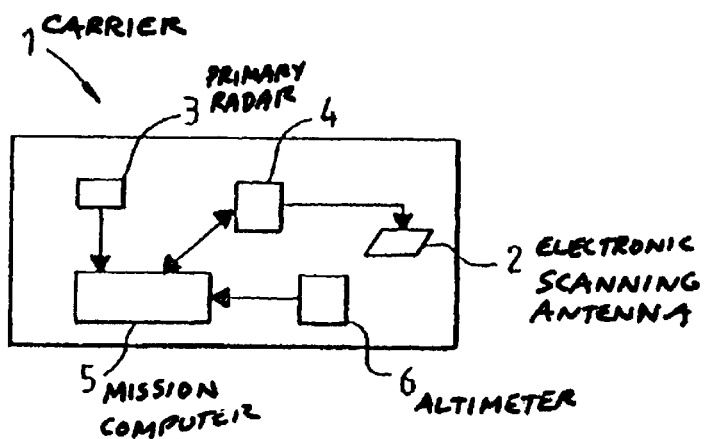

The system of localization shown in FIG. 1 comprises, for example, the following elements: a carrier 1 or aircraft equipped with an electronic scanning antenna 2 with a given direction of aim constituting the secondary radar or IFF radar whose role especially is to identify the target, a primary radar 3 whose function especially as to localize the target, an IFF system 4 which controls the secondary radar. It also comprises a mission computer 5 adapted for example to correlating the information that comes from the primary radar and from the secondary radar in order to carry out a precise identification of the target 7 to be identified. It also has an altimeter 6. The primary radar 3, the IFF system 4 and the altimeter 6 are linked with the mission computer by means of classic links known to those skilled in the art. The carrier also has all the devices commonly used in the field of IFF.

The mission computer 5 retrieves, for example, the information from the primary radar and information coming from the IFF system. It then correlates the localizing information coming from these two radars to send the pilot full information on the blip or the target (the full information comprises, for example, the exact position of the target, its identification, etc.).

The IFF system of the carrier, for example,
  aims the antenna toward the target defined by the mission computer,
  sends out interrogations specified for example by the mission computer, for example an IFF interrogation,
  receives and decodes the responses from the target,
  determines the distance (through computation of the propagation time for example), the altitude (for example by means of the mode C response from the target) and the bearing of the target,
  computes the localization of the target,
  and then transmits this information to the mission computer.

The target 7 to be identified possesses, for example, an IFF responder (not shown) decoding the interrogations received and sending the corresponding responses in round-robin operation. The responder consists of a responder IFF system 8, sender/receiver antennas 9 and an altitude encoder 10 or altimeter known to those skilled in the art.

The IFF system of the target expresses, for example, the altitude of the target in mode C code and responds to the interrogations of the carrier.

For the sake of simplifying the figure, the different elements, namely the radars, the antennas, the IFF system and the computers are not shown in detail.

Figure 2:
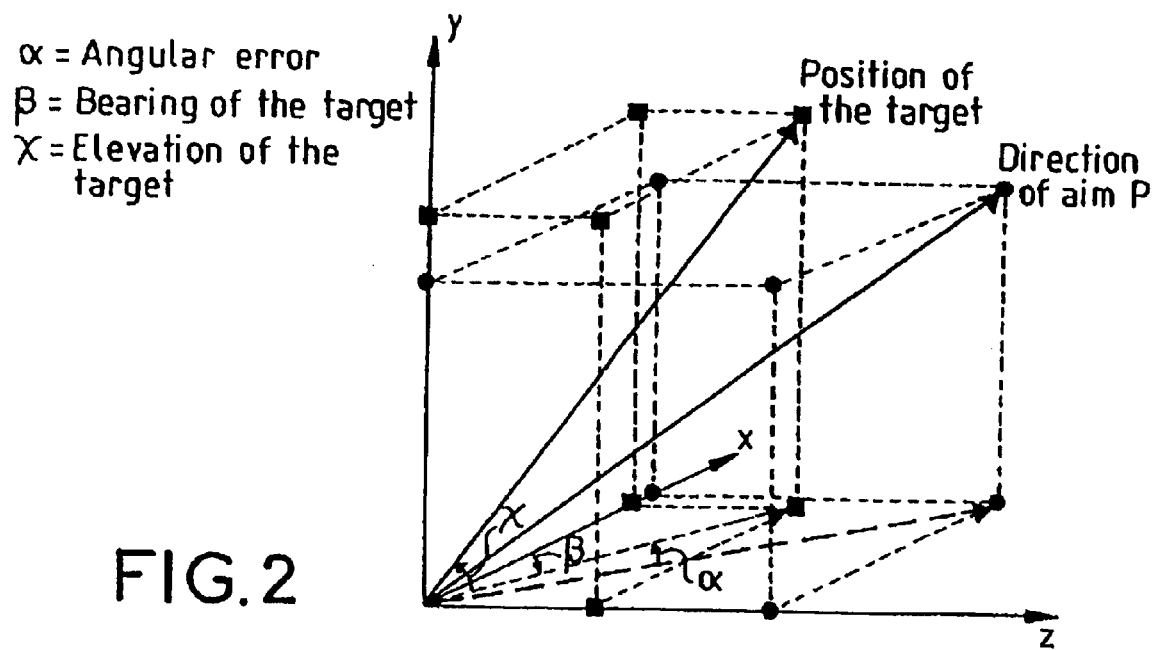
FIG. 2 is an illustration showing different parameters used to determine information on the localization of the target.

Before explaining the steps executed in the method, various parameters and data used are shown schematically in FIG. 2.

The angle of the target is determined, for example, from its response code in mode C as defined, for example, in volume IV, Appendix 10 of the ICAO publication dated July 1998.

The angular error $\alpha$ is given for example by the measurement of the projection, in the plane of the aircraft, of the axis of the target response with respect to the axis of the antenna. This plane is defined for example as a function of the axis of the aircraft: i.e. the plane (Ox, Oz) is parallel to the plane of the aircraft wings, the plane (Ox, Oy) is parallel to the plane of the drift; the axis Ox is in the direction of the true course of the craft.

The distance D between the carrier and the target is determined, for example, through the time elapsed between the interrogation sent by the carrier and the reception of the response from the target. The IFF system of the carrier comprises various digital processor boards (known to those skilled in the art)) and the IFF radar, carries out, for example, these processing operations before sending the information on localization to the mission computer.

The altitude of the carrier is, for example, given directly by the mission computer using information obtained from the altitude meter.

This FIG. 2 also represents the bearing $\beta$ of the target and the elevation $\chi$ of the target.

The following steps of the method are given as a non-restrictive example, with reference to a case in which a target is detected by the primary radar of the aircraft. The pilot sends, for example, a request to the IFF system to identify this given target. The mission computer transmits this request by defining the zone of the space in which this identification must be made.

On the whole, the method of the invention comprises, for example, at least the following two phases:

1. Aiming the antenna in the direction of the zone to be interrogated. To this end, the mission computer, for example, designate the target or zone to be interrogated, and the IFF system of the carrier positions the antenna and therefore carries out the aiming of the antenna (namely directing the interrogation beam to the target).
2. Exploiting the information received from the interrogated target or targets, in order to localize these target with precision.

This exploitation of the data is first of all done at the IFF carrier system, in order to generate the information on localization, and then at the mission computer in order to correlate the information on IFF localization and the information on localization relating to the primary radar.

The information used by the IFF system of the carrier comprises for examples the following:
  Information on distance; the distance corresponds to the set of points equidistant from the target to the carrier, and this set of points constitutes the sphere of localization of the target;
  Information on angular error measurement; the set of points associated with a given angular error value constitutes, for example, a plane perpendicular to the plane of the aircraft;
  Information on altitude; the set of points that may be situated at a given altitude constitutes a plane parallel to the previously defined plane of the aircraft.

Possible Positions of the Target

The possible target positions are determined, for example, from the intersection of the following three geometrical figures: the sphere of localization, the plane perpendicular to the plane of the aircraft, the plane parallel to the plane of the aircraft. There are, at the most, two possible positions for the target as a result of these intersections. FIG. 3 is a diagrammatic view of the plane of equal angular errors (I), a sphere of equidistant targets (II), the plane of equal values of altitude (III), as well as their intersections and the possible positions of the target $P_1$, $P_2$, $P_3$, $P_4$ To determine the exact position of the target, the IFF system of the carrier uses the direction of aim P and the altitude A of the target in order to deduce therefrom the only possible position for the target. For example, the direction of aim P makes it possible to select this only possible position between, firstly, the two pairs $\{P_1, P_3\}$ and, $\{P_2, P_4\}$ and, secondly, the value of the altitude of the target between the points $P_1$ and $P_3$ or $P_2$ and $P_4$.

Localization

To carry out the second phase, namely that of localization of the target, the method executes for example the following steps described in detail here below.

First of all, some of the notations used are recalled.

The altitude A of the target: let us take a target situated at the altitude A, where A is expressed in meters. The altitude is given, for example, by the decoding of the SIF C code according to the definition given in volume IV, Appendix 10 of the ICAO publication dated July 1998. The IFF equipment uses the response received in mode C to determine the altitude of the target, for example upon reception of a mode C code, decodes this response for example and converts it into altitude.

The bearing $\beta$ of the target: relative to the carrier, this target is at a position corresponding to the bearing $\beta$ and at a distance D, with $\beta$ expressed in degrees and D expressed in meters for example. This distance D is determined, for example, by measuring the time between the sending of the interrogation request and the reception of the response from the target, by the IFF system of the carrier.

The elevation of the target: obtained, for example, by $\chi = \mathrm{asin}((A-A_{pf}/D))$.

The altitude of the platform: referenced Apf.

The angular error measurement: the measurement of the angular error $\alpha$ of the target by measurement of the angle between the aiming direction and the direction of reception of the response.

The aiming direction P: expressed in degrees relative to the direction of the platform.

These different parameters are, for example, localized in an <<aircraft referential system>> shown schematically in FIG. 3. In this given this referential system is seen with the platform in a back view, x giving the direction of the platform. The angles are given, for example, in the clockwise direction.

The computation steps to determine the position of the target are, for example, the following:

The distance D from the target to the carrier gives the equation defining the iso-distance sphere on which the target is localized:

$$x^2+y^2+z^2=D^2 \tag{1}$$

From the value of the angular error $\alpha$, the IFF system of the carrier determines, for example, a plane parallel to the vertical plane of the platform which, in the plane (x,y), by intersection with the sphere (1) defined here above, will give a circle $C_1$.

Let $z_e$ be the projection of the position of the target on the axis X:

$$Z_e = D\ \sin(\alpha+P) \text{ whatever the value of the pair (x, y)} \tag{2}$$

P corresponds to the aiming direction.

The system of equations obtained from the relationships (1) and (2) is:

$$x^2+y^2+z^2=D^2$$

$$Z_e=D\ \sin(\alpha+P)$$

From the relationships (1) and (2), the IFF system of the carrier deduces the equation of the circle representing the above-mentioned intersection $$x^2+y^2=D^2(1-\sin^2(\alpha+P)) \tag{3}$$

Similarly, in the plane (x,z), the IFF system of the carrier may obtain a plane corresponding to the iso-altitude plane of the target.

Let $y_a$ be the projection of the position of the target on the axis y:

$$y_a=(A-A_{pf}) \text{ whatever the pair } (x, z) \tag{4}$$

whence the system of equations deduced from the relationships (1) and (4) by the IFF system $$x^2+y^2+z^2=D^2$$

$$y_a=A-A_{pf}$$

which deduces, from this, the circle $C_2$ resulting from the intersection with the initial sphere $$x^2 + z^2 = D^2 - (A - A_{pf})^2 \tag{5}$$

$$= D^2 - y_a^2$$

To obtain the possible coordinates, for example of the target, the IFF system brings about the intersection of the two circles $C_1$ and $C_2$ defined by the relationships (3) and (5).

$$\begin{cases} y^2 + x^2 = D^2(1 - \sin^2(\alpha + P)) \\ x^2 + z^2 = D^2 - y_a^2 \end{cases} \tag{6}$$

$$\Rightarrow \begin{cases} y^2 = D^2(1 - \sin^2(\alpha + P)) - x^2 \\ z^2 = D^2 - y_a^2 - x^2 \\ x^2 + y^2 + z^2 = D^2 - x^2 \end{cases}$$

$$\Rightarrow D^2 - D^2\sin^2(E + P) - x^2 + D^2 - y_a^2 - x^2 + x^2 = D^2$$

$$\Rightarrow x^2 = D^2(1 - \sin^2(\alpha + P)) - y_a^2$$

The coordinates of the target in the aircraft referential system are determined by the following relationships:

$$\begin{cases} z = D\sin(\alpha + P) & (2) \\ y = A - A_{pf} & (4) \\ x = \pm\sqrt{D^2(1 - \sin^2(\alpha + P)) - y_a^2} & (6) \end{cases}$$

To remove the indeterminacy with respect to x, the IFF system executes, for example, the following additional step:

$$\begin{cases} Si -90° < (P + \alpha) < +90° \Rightarrow x = \sqrt{D^2(1 - \sin^2(\alpha + P)) - y_a^2} \\ Si \begin{cases} (P+\alpha) > +90° \\ (P+\alpha) < -90° \end{cases} \Rightarrow x = -\sqrt{D^2(1 - \sin^2(\alpha + P)) - y_a^2} \end{cases}$$

This indeterminacy is shown in FIG. 5 which represents the two corresponding solutions.

What is claimed is:

1. A method of determining the position of a target using an antenna having a given direction of aim, wherein the method comprises; combining at least three parameters that represent a position of the target, a position of a carrier of the antenna and an antenna beam-aiming direction to localize the target.

wherein the three parameters used are a distance D from the target to the carrier, an altitude A of the target and an altitude $A_{pf}$ of the carrier equipped with the IFF antenna and the angular error value of the target.

2. The method according to claim 1, comprising the following steps:

determining a circle $C_1$ resulting from an intersection between an iso-distance sphere on which the target is situated and a plane substantially parallel to the vertical plane of the carrier equipped with the antenna;

determining a circle $C_2$ that comes from the intersection between an iso-altitude plane of the target and an iso-distance sphere; and achieving the intersection of the two circles $C_1$ and $C_2$ to obtain the coordinates of the target.

3. The method according to claim 2, wherein the coordinates of the target are given by the following relationships:

$$\begin{cases} z = D\sin(\alpha + P) & (2) \\ y = A - A_{pf} & (4) \\ x = \pm\sqrt{D^2(1 - \sin^2(\alpha + P)) - y_a^2} & (6) \end{cases}$$

4. The method according to claim 3, wherein the x coordinates are specified as follows:

$$\begin{cases} Si - 90° < (P+\alpha) < +90° \Rightarrow x = \sqrt{D^2(1 - \sin^2(\alpha + P)) - y_a} \\ Si \begin{cases} (P+\alpha) > +90° \\ (P+\alpha) < -90° \end{cases} \Rightarrow x = -\sqrt{D^2(1 - \sin^2(\alpha + P)) - y_a^2} \end{cases}$$

5. The method according to claim 4, wherein a mode of interrogation from the carrier to the target is an IFF mode C.

6. The method according to claim 3, wherein a mode of interrogation from the carrier to the target is an IFF mode C.

7. The method according to claim 2, wherein a mode of interrogation from the carrier to the target is an IFF mode C.

8. The method according to claim 2, wherein a mode of interrogation from the carrier to the target is an IFF mode C.

9. The method according to claim 1, wherein a mode of interrogation from the carrier to the target is an IFF mode C.

10. The method according to claim 1, comprising the following steps:
    determining a circle $C_1$ resulting from an intersection between an iso-distance sphere on which the target is situated and a plane substantially parallel to the vertical plane of the carrier equipped with the antenna;
    determining a circle $C_2$ that comes from the intersection between an iso-altitude plane of the target and an iso-distance sphere; and
    achieving the intersection of the two circles $C_1$ and $C_2$ to obtain the coordinates of the target.

11. The method according to claim 1, wherein a mode of interrogation from the carrier to the target is an IFF mode C.

12. The system for the localization of a target by a carrier by means of a carrier equipped with an antenna wherein the system comprises:
    a primary radar; and
    an IFF system adapted to combine at least three parameters that represent a position of the target, a position of the carrier and an antenna beam-aiming direction to localize the target.

13. The system according to claim 12, wherein the three parameters used are a distance D from the target to the carrier, an altitude A of the target and an altitude $A_{pf}$ of the carrier equipped with the IFF antenna and the angular error value of the target.

14. The system according to claim 12, wherein one parameter is a distance D from the target to the carrier.

15. The system according to claim 12, wherein one parameter is a position of the carrier.

16. The system according to claim 12, wherein one parameter is an antenna beam-aiming direction to localize the target.

17. The system according to claim 12, wherein the antenna has one of a given direction of aim and a secondary antenna.

* * * * *